No. 701,501. Patented June 3, 1902.
C. E. PARKER.
CATGUT LIGATURE AND SUTURE AND METHOD OF PREPARING THE SAME.
(Application filed Apr. 2, 1900.)
(No Model.)

Witnesses:
Henry W. Bulkley
Geo. F. Towne

Inventor:
Chas. E. Parker.

UNITED STATES PATENT OFFICE.

CHARLES E. PARKER, OF ORANGE, NEW JERSEY.

CATGUT LIGATURE AND SUTURE AND METHOD OF PREPARING SAME.

SPECIFICATION forming part of Letters Patent No. 701,501, dated June 3, 1902.

Application filed April 2, 1900. Serial No. 11,251. (No model.)

*To all whom it may concern:*

Be it known that I, CHARLES E. PARKER, a citizen of the United States, residing at Orange, in the county of Essex and State of New Jersey, have invented a new and useful Improvement in Catgut Ligatures and Sutures and Method of Preparing the Same and in Packages Thereof for Applying said Method of Preparation, of which the following is a specification.

My invention relates to the preparation of the catgut and its sterilization by the action of steam, hot water, and other fluids; and the objects of my invention are, first, to overcome the tendency of these agents to cause swelling and longitudinal contraction of the catgut; second, to diminish its elasticity or capacity for stretching; third, to prevent impairment of its tensile strength, and, fourth, to facilitate the extemporaneous sterilization of the catgut by the surgeon and to preserve the sterilized catgut from accidental contamination. I attain the first three of these objects by a general method of sterilization under tension and all of them by the use of an expansible spool or reel upon which the catgut is wound and secured, the whole being inclosed within a container permeable to sterilizing fluids, but not to dust. I apply this principle by means of the package shown in the accompanying drawings, in which—

Figure 1:
Figure 2:
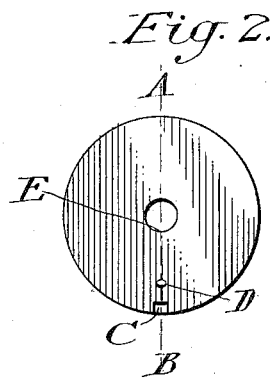
Figure 3:
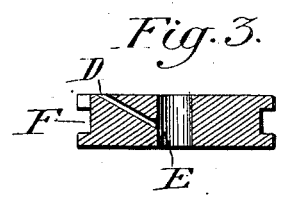
Figure 5:
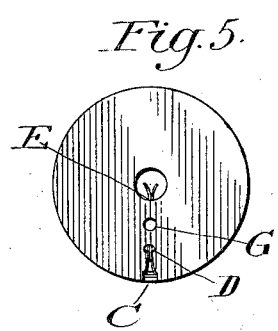
Figure 4:
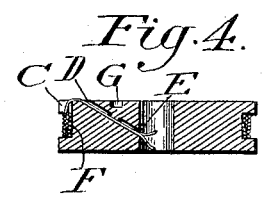
Figure 6:
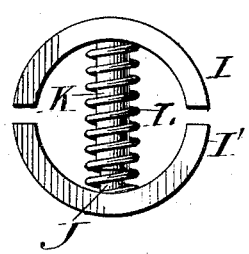
Figure 7:
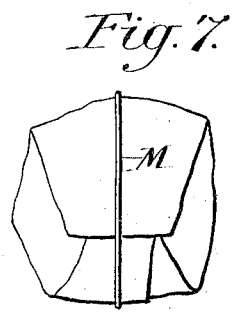

Figure 1 shows an elevation of an expansible spool or reel. Fig. 2 is a plan of the same, and Fig. 3 is a section on the line A B. Fig. 4 is a similar section of a spool wound with catgut, and Fig. 5 is a plan of the same. Fig. 6 is a plan of another form of expansible spool. Fig. 7 shows a complete package in its wrapper or container.

Absorbable surgical ligatures, as catgut and tendon, possess the great advantage over non-absorbable ligatures—such as silk, silkworm-gut, &c.—that when sterile they do not act as foreign bodies in the tissues, causing irritation and eventually being discharged through a sinus, but are gradually absorbed or incorporated. Most effectual sterilizing processes, however, are inapplicable to catgut on account of impairing its strength.

It has been discovered that by the action of formaldehyde catgut may be toughened, so that to a considerable degree it resists the disintegrating action of boiling water, which next to fire is the most effective disinfectant.

Ligatures are prepared by macerating them either loose or wound upon a non-expansible frame in formaldehyde solution of two to ten per cent. strength for twenty-four hours or more, washing out the formaldehyde by treatment with running water and drying. They may then be sterilized by steam or boiling water. Thus treated the hot water causes the catgut to become elastic, elongating under tension, but contracting, if permitted, to much less than its original length and swelling greatly.

I have discovered that if during the treatment with hot water or steam the catgut be maintained under strong longitudinal tension by any suitable means, as the expansion of an expansible frame or reel upon which it may be wound and secured, it not only acquires no tendency to kink, as would result if the coils were free, but the swelling and elasticity or extensibility are minimized, and the material is dense, firm, pliable, and strong, and of superior utility.

For the purpose of maintaining tension during the sterilization various expedients will readily suggest themselves. Therefore I do not desire to be restricted to the particular method herein described, which, however, has the advantage that it permits the ligature to be sterilized within the closed container or wrapper in which it is to be preserved until needed for use.

The catgut suitably prepared to endure the sterilizing action of steam, boiling water, or aqueous solutions is wound and secured upon an expansible spool or reel. The spool may have various forms, and the expansion may be produced in various ways. Therefore I do not desire to be restricted to the particular forms of spool here described. I prefer to utilize the expansion with heat and moisture of a wooden spool.

Figs. 1, 2, and 3 show a wooden spool having its axis parallel to the grain of the wood. At C one of the flanges of the spool is notched down to the bottom of the circumferential groove F, and a diagonal hole D E is bored from the end of the spool at an intermediate point D on the radius passing through the notch C. A suitable amount of catgut prepared for sterilizing is tightly wound on the spool in the groove F, both ends being brought out through the notch C, inserted through the hole D E, and drawn tight. The ends are then secured by crushing in the wood upon the hole D E by a blow upon a punch applied at G, Figs. 4 and 5. Fig. 6 shows a different spool, preferably of metal, consisting of circumferentially-grooved arcs I and I', provided, respectively, with the pin J and sleeve K, permitting a parallel approach of the two arcs and carrying a spiral spring L to keep them elastically separated. The arcs having been pressed together, the ligature is wound in the circumferential groove and secured by binding the ends to adjacent coils of the ligature, and the arcs are then released. The spiral spring produces the required tension upon the ligature. The spool and ligature thus prepared are inclosed in a wrapping or container of paper or similar material which is permeable to sterilizing fluids, but will exclude dust or any solid carrier of infection, and suitably secured by a band M or otherwise. The whole package is then ready to be subjected to the sterilizing action of steam, hot water, or aqueous solutions in the usual manner, after which it may be dried, and so preserved or kept in an antiseptic solution if not required for immediate use.

I prefer the above-described method of securing the ligature to the wooden spool, because the former may be conveniently detached from the spool by cutting the portion of the ends accessible at D without danger of injury to the remainder of the ligature. I do not, however, desire to be restricted to this method. The ends may be secured in other ways relatively to each other to maintain the tension produced by the expansion of the spool. They may be secured directly to each other, as by tying, or they may be secured to or by other means, as by binding them with a loop of catgut or string to adjacent coils of the ligature or by inserting them through a hole or holes in the spool only large enough to receive them. The first effect of the sterilization process is to cause the free extreme end of the ligature to swell greatly and become incapable of retraction under the tension produced.

I claim as my invention—

1. As an article of manufacture, a catgut ligature wound upon an expansible spool, substantially as and for the purpose described.

2. As an article of manufacture, a sterilizing ligature-package consisting of a catgut ligature disposed upon an expansible spool by winding, and relatively securing its ends to maintain tension, substantially as described.

3. As an article of manufacture a sterilizing ligature-package consisting of a catgut ligature disposed upon an expansible spool by winding, and relatively securing its ends to produce extension, and inclosed in a container permeable to sterilizing fluids, substantially as described.

4. The method of treating a catgut ligature consisting in maintaining it under longitudinal tension while subjecting it to the action of a sterilizing fluid, substantially as described.

5. As an article of manufacture, a sterilized ligature-package consisting of a catgut ligature disposed upon an expansible spool by winding, and securing its ends relatively to produce extension, substantially as described.

6. As an article of manufacture a sterilized ligature-package consisting of a catgut ligature disposed upon an expansible spool by winding, and securing its ends relatively to produce extension, and inclosed in a container permeable to sterilizing fluids, substantially as described.

CHAS. E. PARKER.

Witnesses:
LINDSAY DEB. LITTLE,
M. J. PARKER.